US012000539B2

(12) United States Patent
Sato et al.

(10) Patent No.: US 12,000,539 B2
(45) Date of Patent: Jun. 4, 2024

(54) HIGH-PRESSURE TANK LINER MANUFACTURING DEVICE AND METHOD

(71) Applicants: HONDA MOTOR CO., LTD., Tokyo (JP); Yachiyo Industry Co., Ltd., Sayama (JP)

(72) Inventors: Takaharu Sato, Tokyo (JP); Yuka Kishi, Saitama (JP); Mikio Ishiyama, Saitama (JP); Shinya Sato, Saitama (JP); Junya Yoshioka, Saitama (JP)

(73) Assignees: HONDA MOTOR CO., LTD., Tokyo (JP); YACHIYO INDUSTRY CO., LTD., Sayama (JP)

( * ) Notice: Subject to any disclaimer, the term of this patent is extended or adjusted under 35 U.S.C. 154(b) by 0 days.

(21) Appl. No.: 18/340,283

(22) Filed: Jun. 23, 2023

(65) Prior Publication Data

US 2023/0417369 A1 Dec. 28, 2023

(30) Foreign Application Priority Data

Jun. 27, 2022 (JP) ................................ 2022-102761

(51) Int. Cl.
*F17C 13/00* (2006.01)

(52) U.S. Cl.
CPC .... *F17C 13/002* (2013.01); *F17C 2203/0604* (2013.01); *F17C 2223/035* (2013.01)

(58) Field of Classification Search
CPC ............ F17C 13/002; F17C 2203/0604; F17C 2223/035
See application file for complete search history.

(56) References Cited

U.S. PATENT DOCUMENTS 2,941,064 A * 6/1960 Gieser, Jr. .............. B23K 11/16 219/92
3,001,058 A * 9/1961 Faber ................... B23K 9/0026 219/127
2005/0260372 A1* 11/2005 Matsuoka ................. F17C 1/16 264/540
2008/0223735 A1* 9/2008 Ishikawa ........... B29C 66/00141 219/121.64

FOREIGN PATENT DOCUMENTS

JP 2020-056468 A 4/2020

* cited by examiner

*Primary Examiner* — Rick K Chang
(74) *Attorney, Agent, or Firm* — Rankin, Hill & Clark LLP

(57) ABSTRACT

A high-pressure tank liner manufacturing device includes: a heater to heat and melt end surfaces of liner halves; a heater transportation mechanism configured to slidably move the heater between a waiting position for the heater and a heating position for the heater; an elevation mechanism (drive mechanism) configured to drive a pair of the liner halves so as to cause the pair of liner halves to be relatively moved closer to each other or away from each other; and a parallelism adjustment mechanism configured to adjust parallelism of the end surfaces of the liner halves in accordance with the heater being slidably moved.

6 Claims, 13 Drawing Sheets

HIGH-PRESSURE TANK LINER MANUFACTURING DEVICE AND METHOD

CROSS-REFERENCE TO RELATED APPLICATION

This application claims the benefit of priority to Japanese Patent Application No. 2022-102761 filed on Jun. 27, 2022, the disclosures of all of which are hereby incorporated by reference in their entireties.

TECHNICAL FIELD

The present invention relates to a high-pressure tank liner manufacturing device and a high-pressure tank liner manufacturing method.

BACKGROUND OF THE INVENTION

A so-called high-pressure tank for storing high-pressure gas has been known to have a fiber reinforced resin layer formed on an outer side of a cylindrical liner (high-pressure tank liner) comprising thermoplastic resin (see Japanese Patent Application Publication No. 2020-56468 A, hereinbelow referred to as Patent Document 1, for example). This liner is manufactured by welding liner halves in a cylindrical shape with each other.

SUMMARY

Problems to be Solved

It is envisaged, for example, that a manufacturing method of the liner (see Patent Document 1, for example) as described above may include: a parallelism adjusting step of causing end surfaces of liner halves to face each other so as to keep parallelism within a predetermined range; a step of transporting a heater to a position between the end surfaces of the liner halves and then heating and melting the end surfaces of the liner halves by the heater; and a step of evacuating the heater from between the end surfaces of the liner halves and welding the end surfaces of the liner halves with each other while keeping parallelism within the predetermined range.

Such a manufacturing method allows for evenly heating the end surfaces circumferentially by adjusting parallelism of the end surfaces of the liner halves so as to be kept within a predetermined range. It is envisaged that welding the end surfaces of the liner halves with each other, while keeping parallelism within a predetermined range, greatly improves welding quality of an obtained liner.

On another note, a manufacturing device of a liner to implement such a manufacturing method is assumed to have the heater as being a heavy object (around 100 kg), in consideration of a size (diameter) of a liner half. Accordingly, the manufacturing device needs to include a heater transportation mechanism of transporting the heater to a position between the end surfaces of the liner halves and then evacuating the heater from between the end surfaces of the liner halves.

However, a center of gravity of such a manufacturing device significantly varies between when the heater being positioned between the end surfaces of the liner halves and when the heater having been evacuated from between the end surfaces of the liner halves, in accordance with the heater as a heavy object being moved. This may cause a risk of the liner halves, preliminarily set in the manufacturing device so as to keep parallelism within a predetermined range, being moved in accordance with a center of gravity of the manufacturing device being changed. If the end surfaces of the liner halves, deviated from a predetermined range of parallelism (e.g., by 0.2 mm or less), were heated and welded with each other, expected favorable quality of welding the end surfaces of the liner halves with each other would not be accomplished.

The present invention is intended to provide a high-pressure tank liner manufacturing device and a high-pressure tank liner manufacturing method, to allow for more reliably accomplishing favorable quality of welding liner halves with each other.

Solution to Problems

A high-pressure tank liner manufacturing device of the present invention for welding end surfaces of a pair of liner halves set to face each other into a single piece, solving the problems, includes: a heater positioned between the end surfaces of the pair of liner halves, facing each other, to heat and melt the end surfaces of the pair of liner halves; a heater transportation mechanism configured to slidably move the heater between a waiting position for the heater, away from the pair of liner halves, and a heating position for the heater set between, for heating, the end surfaces of the pair of liner halves; a drive mechanism configured to drive at least one of the pair of liner halves so as to cause the pair of liner halves to be relatively moved closer to each other or away from each other; and a parallelism adjustment mechanism configured to adjust parallelism of the end surfaces of the pair of liner halves in accordance with the heater being slidably moved.

In addition, a high-pressure tank liner manufacturing method of the present invention, solving the problems, includes: a setting step of setting a pair of liner halves so as to face each other; a transporting heater step of slidably moving a heater at a waiting position, away from the pair of liner halves, to a heating position set between, for heating, end surfaces of the pair of liner halves; a heating step of heating and melting the end surfaces of the pair of liner halves; an evacuating heater step of slidably moving the heater at the heating position to the waiting position for evacuation; and a welding step of welding the end surfaces of the pair of liner halves to make the pair of liner halves into a single piece, wherein the manufacturing method further includes a parallelism adjusting step, at least between the evacuating heater step and the welding step, of adjusting parallelism of the end surfaces of the pair of liner halves in accordance with the heater being slidably moved.

Advantageous Effects of the Invention

The high-pressure tank liner manufacturing device and high-pressure tank liner manufacturing method of the present invention more reliably accomplish favorable quality of welding liner halves with each other.

DETAILED DESCRIPTION

Next, a description is given in detail of an embodiment of the present invention, with reference to the drawings as required. First described is a high-pressure tank with a high-pressure tank liner obtained by a manufacturing method of the embodiment.

<<High-Pressure Tank>>

Figure 1:
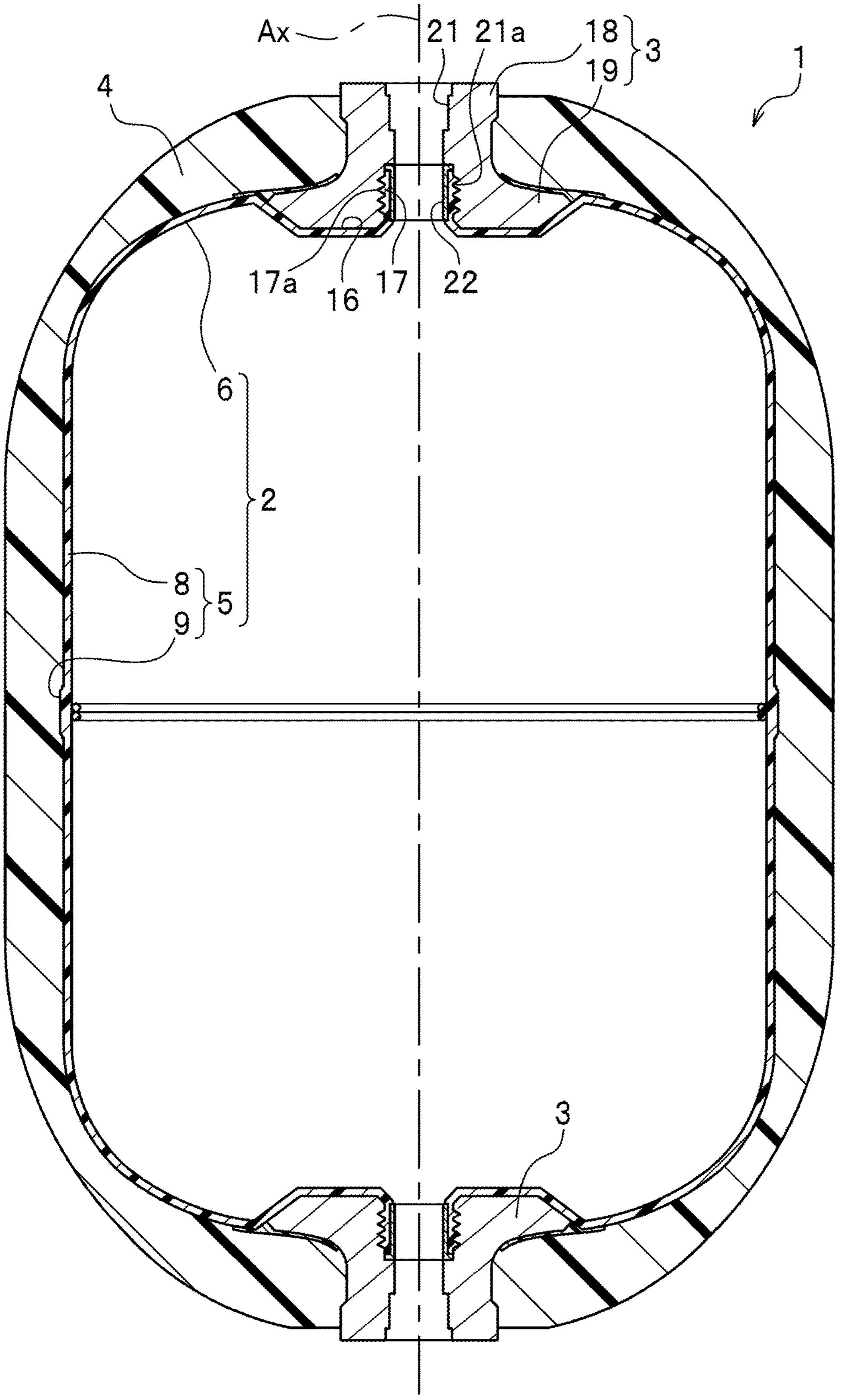
FIG. 1 is a longitudinal sectional view of a high-pressure tank with a high-pressure tank liner obtained by a manufacturing method according to an embodiment of the present invention.

FIG. 1 is a longitudinal sectional view of a high-pressure tank 1 according to the embodiment of the present invention. The high-pressure tank 1 of the embodiment is assumed to be one mounted in a fuel-cell car and storing hydrogen gas to be supplied to a fuel-cell system, for example. However, the high-pressure tank 1 is not limited thereto and may be used for other high-pressure gases.

As shown in FIG. 1, the high-pressure tank 1 includes a high-pressure tank liner 2 (hereinbelow, sometimes referred to as simply "liner 2"), to be described below in detail, a cap 3 coupled to the liner 2, and a fiber reinforced resin layer 4 covering outer sides of the liner 2 and cap 3, from over the liner 2 to the cap 3.

The cap 3 is assumed to be one formed from a metallic material such as aluminum alloy. The cap 3 includes a cap body 18 in a cylindrical shape, having inside a feed-and-discharge bore 21, and a flange 19 formed at one end in an axis direction of the cap body 18. The feed-and-discharge bore 21 communicates with inside of the high-pressure tank 1 at said one end formed with the flange 19. The feed-and-discharge bore 21 has piping (not shown), communicating with the fuel-cell system or the like, connected thereto at the other end thereof.

The cap body 18 is formed, at one end thereof in an inner circumferential surface thereof defining the feed-and-discharge bore 21, with a threaded wall 21*a* engaging with a threaded outside 17*a* formed on a cylindrical portion 17 of the liner 2, to be described below. An O-ring (not shown) is to be mounted between a front end of the cylindrical portion 17 of the liner 2 and the inner circumferential surface of the cap body 18 defining the feed-and-discharge bore 21.

In addition, a collar 22 in a cylindrical shape, comprising a metallic material, is provided inside the feed-and-discharge bore 21. The collar 22 extends from one end thereof, supported by the inner circumferential surface of the cap body 18 defining the feed-and-discharge bore 21, toward the liner 2 and is fitted into the cylindrical portion 17 of the liner 2

The fiber reinforced resin layer 4 of the embodiment is assumed to be one obtained through a filament winding (FW) step of winding reinforcing fiber around outer circumferential surfaces of the liner 2 and cap 3, from over the liner 2 to the cap 3, and a resin transfer molding (RTM) step of arranging the liner 2 applied with reinforcing fiber in a predetermined die, filling matrix resin in the die, and curing the contents in the die.

The reinforcing fiber of the embodiment is assumed to be a strip-shaped roving (not shown) formed by bundling strands comprising carbon fiber filaments. However, the reinforcing fiber is not limited thereto and aramid fiber, boron fiber, alumina fiber, silicon carbide fiber, or the like may be used, for example.

The matrix resin of the embodiment is assumed to be one comprising a cured thermosetting resin, such as epoxy resin, phenol resin, unsaturated polyester resin, and polyimide resin. However, the fiber reinforced resin layer 4 is not limited to one obtained through the RTM step and may be one obtained by winding prepreg, with matrix resin impregnated in advance into reinforcing fiber, around the outer circumferential surfaces of the liner 2 and cap 3 and then curing the matrix resin.

<<High-Pressure Tank Liner>>

Next, a description is given of the liner 2 (see FIG. 1) obtained by a manufacturing method of the embodiment. The liner 2 is a hollow body comprising thermoplastic resin. The thermoplastic resin includes polyamide resin and polyethylene resin, but is not limited to these. The liner 2 of the embodiment includes a body section 5 made of a cylindrical body, and rounded end sections 6 formed at both ends of, integrally with, the body section 5.

The body section 5 includes a general portion 8 formed to have a predetermined outer diameter and occupying most in an axis (Ax) direction of the body section 5, and an expanded diameter portion 9 formed at a center in the axis (Ax) direction of the body section 5 and having an expanded diameter as compared with the general portion 8. The expanded diameter portion 9 is formed through cutting a joined portion 36 (see FIG. 7G), having end surfaces of a pair of liner halves 31 (see FIG. 2) joined by welding, as will be described in detail below.

The rounded end section 6 is a flattened bowl-shaped portion converging from the body section 5 so as to have a gradually decreasing diameter with increasing distance in the axis (Ax) direction, away outward, from the body section 5, as shown in FIG. 1. The rounded end section 6 has, in a center in a radial direction thereof, a sunken portion 16 sunken so as to follow a profile of the flange 19 of the cap 3. In addition, the sunken portion 16 has, in a center in a radial direction thereof, the cylindrical portion 17 so as to protrude into the feed-and-discharge bore 21 in the cap 3.

The threaded outside 17*a* engaging with the threaded wall 21*a* for the feed-and-discharge bore 21 is formed on the outer circumferential surface of the cylindrical portion 17.

<<High-Pressure Tank Liner Manufacturing Device>>

Figure 2:
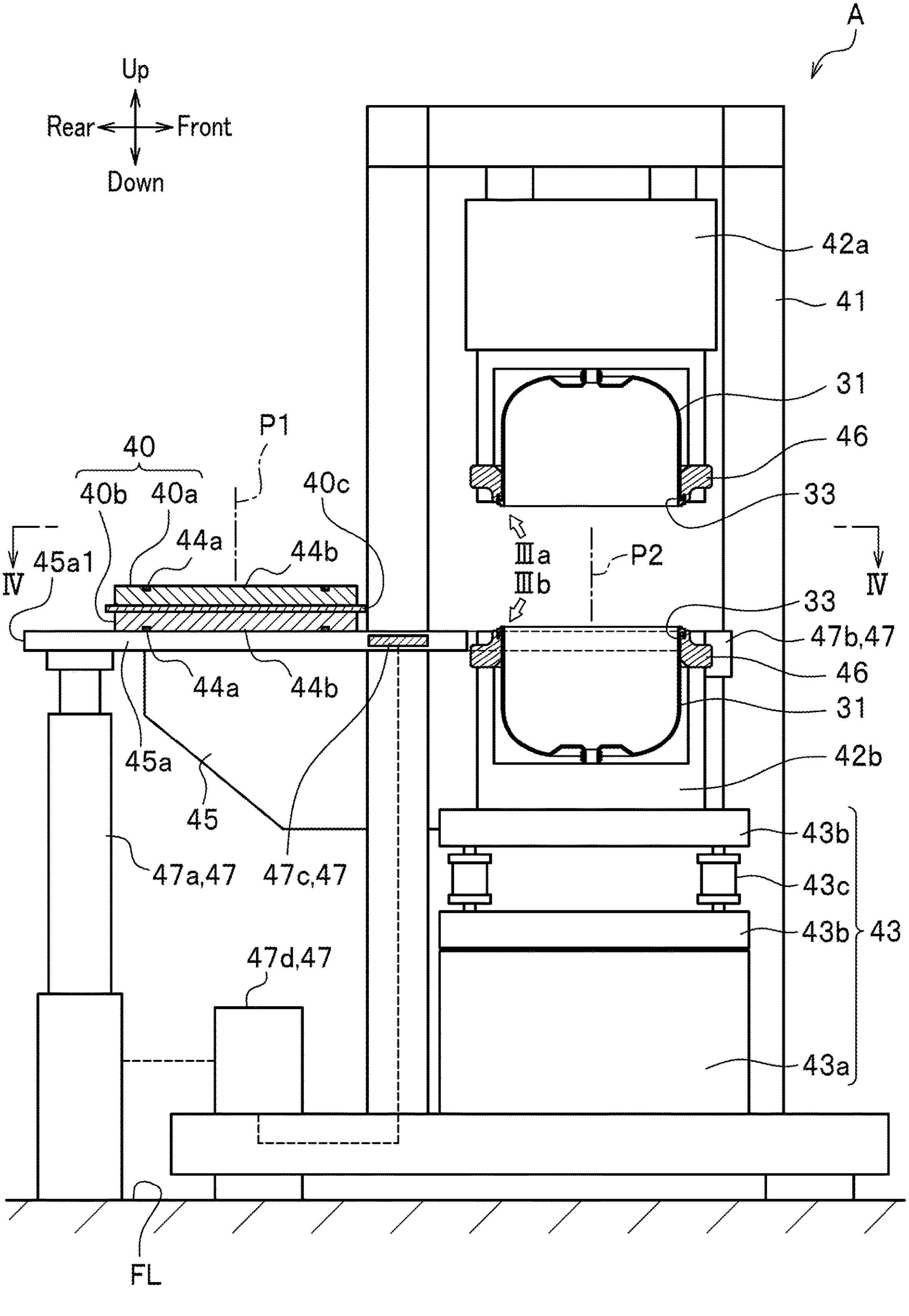
FIG. 2 illustrates a configuration of a high-pressure tank liner manufacturing device according to the embodiment of the present invention.

Next, a description is given of a manufacturing device of the liner 2 (see FIG. 1). FIG. 2 illustrates a configuration of a manufacturing device A of the embodiment. Hereinbelow, an upper, lower, right, left directions are based on those in FIG. 2 as aligned with those of the manufacturing device A. The manufacturing device A of the embodiment is configured to weld the pair of liner halves 31 with each other into a single piece, as shown in FIG. 2.

<Liner Half>

The liner half 31 (see FIG. 2) is described first. The liner half 31 has substantially the same shape as one having the liner 2 in FIG. 1 divided into halves at a center in the axis (Ax) direction, except for having a flange 32 (see FIGS. 3A and 3B) and a protruding end 34 (see FIGS. 3A and 3B), which are to be described below. The liner halves 31 are welded with each other, on ends thereof having openings 33 (see FIG. 2), into a single piece.

Figure 3A:
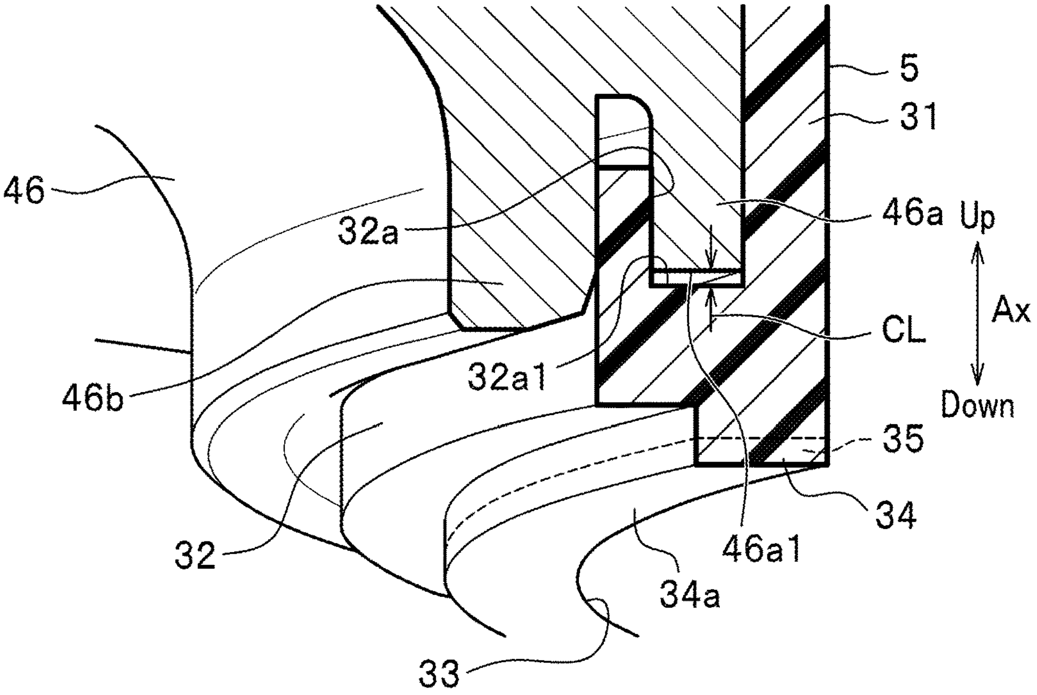
FIG. 3A is a partially enlarged perspective view of a lower end of a liner half, as viewed from a direction IIIa in FIG. 2.
Figure 3B:
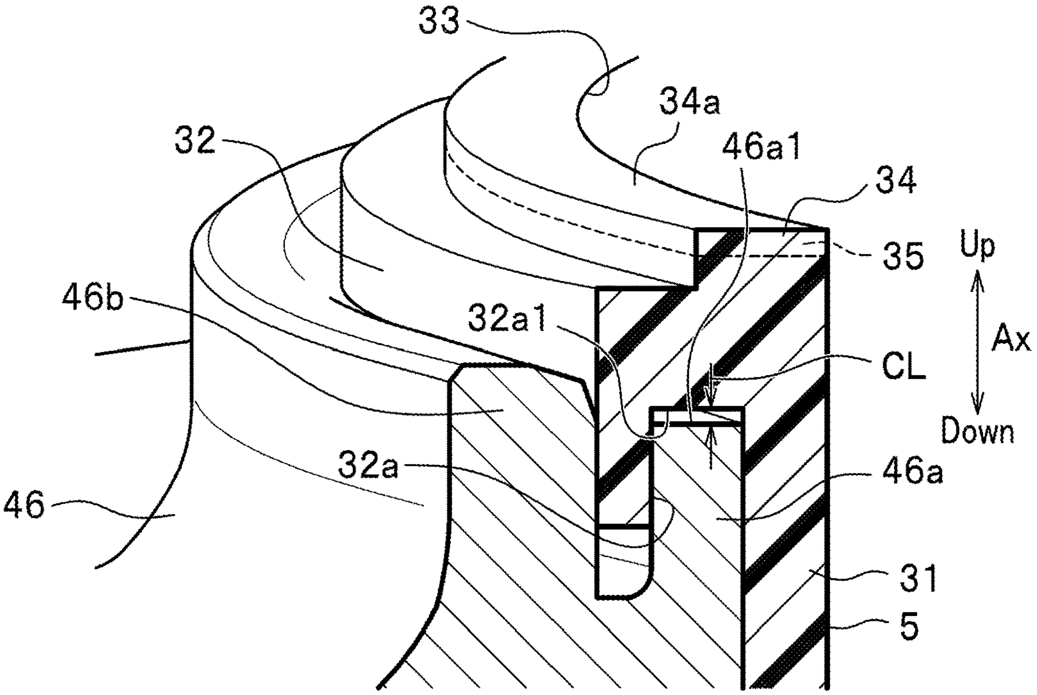
FIG. 3B is a partially enlarged perspective view of an upper end of the liner half, as viewed from a direction IIIb in FIG. 2.

FIG. 3A is a partially enlarged perspective view of a lower end of the upper liner half 31, as viewed from a direction IIIa in FIG. 2. FIG. 3B is a partially enlarged perspective view of an upper end of the lower liner half 31, as viewed from a direction IIIb in FIG. 2. The flange 32 is, as shown in FIGS. 3A and 3B, a circular body formed integrally and coaxially with the body section 5 of the liner half 31, so as to radially bulge outward from the body section 5. The flange 32 is formed with a circumferential groove 32*a*. The circumferential groove 32*a* extends along a circumferential direction of the flange 32 so as to open upward. A bottom surface 32*a*1 in the circumferential groove 32 is formed flat and parallel to an end surface 34*a* of the protruding end 34, which is also flat.

The protruding end 34 is, as shown in FIGS. 3A and 3B, a circular body formed, integrally and coaxially with the body section 5, on an end surface of the liner half 31 having the opening 33. An outer diameter of the protruding end 34 is set to be larger than an outer diameter of the body section 5 of the liner half 31 and smaller than an outer diameter of the flange 32. An inner diameter of the protruding end 34 is set to be the same as that of the liner half 31. A thickness of the protruding end 34, in the axis Ax direction of the liner half 31, is set to be larger than a welding margin 35 required for welding the liner halves 31 as described below.

Referencing back to FIG. 2, the manufacturing device A of the embodiment includes a frame 41 disposed on a floor FL such as a ground, an upper supporter 42*a* configured to support the upper liner half 31 of the pair of liner halves via a support jig 46 at an upper portion of the frame 41, a lower supporter 42*b* coupled to an elevation mechanism 43 and configured to support the lower liner half 31 via the support jig 46, the elevation mechanism 43 configured to move the lower supporter 42*b* up and down, a heater 40 configured to heat and melt a part of the liner half 31, a transportation mechanism 45 configured to transport the heater 40, and a parallelism adjustment mechanism 47 configured to set parallelism of the end surfaces of the pair of liner halves 31 within a predetermined range. Note that the elevation mechanism 43 corresponds to an "drive mechanism" in one or more claims. The transportation mechanism 45 corresponds to a "heater transportation mechanism" in one or more claims.

<Support Jig>

As shown in FIG. 2, the upper supporter 42*a* has the support jig 46 attached to a lower end thereof, to support the liner half 31 having the opening 33 facing downward. The lower supporter 42*b* has the support jig 46 attached to an upper end thereof, to support the liner half 31 having the opening 33 facing upward. The pair of the upper and lower support jigs 46 are arranged, as will be described below, so as to each lock the flange 32 (see FIGS. 3A and 3B) of the liner half 31 and contact an outer circumferential surface of the body section 5 (see FIGS. 3A and 3B) of the liner half 31. As a result, the support jigs 46 help the upper supporter 42*a* and lower supporter 42*b* support the liner halves 31.

The upper support jig 46 of the pair of upper and lower support jigs 46 includes an inner stop 46*a* and an outer stop 46*b* to lock the flange 32, as shown in FIG. 3A. The inner stop 46*a* contacts the outer circumferential surface of the body section 5 of the liner half 31 and is fitted into the circumferential groove 32*a* of the flange 32. A front end surface 46*a*1 of the inner stop 46*a* is formed flat so as to be parallel to the bottom surface 32*a*1 in the circumferential groove 32*a*.

The outer stop 46*b* is provided on radially outer side of the inner stop 46*a* so as to contact the outer circumferential surface of the flange 32. In particular, the outer stop 46*b* and the inner stop 46*a*, fitted into the circumferential groove 32*a*, hold a radially outer wall for the circumferential groove 32*a* in the flange 32 therebetween.

As shown in FIG. 3B, the liner half 31 and support jig 46 set on a lower side is provided so as to be vertically symmetric to the liner half 31 and support jig 46 in FIG. 3A set on an upper side. That is, as shown in FIG. 3B, the lower liner half 31 is formed, at an end thereof having the opening 33, with the flange 32 having the circumferential groove 32*a* and the protruding end 34 having the welding margin 35, as with the upper liner half 31 (see FIG. 3A).

In addition, the lower support jig 46 includes the inner stop 46*a* to be fitted into the circumferential groove 32*a* of the flange 32, and the outer stop 46*b* to hold a radially outer wall for the circumferential groove 32*a* of the flange 32 between itself and the inner stop 46*a*, as with the upper support jig 46 shown in FIG. 3A. The front end surface 46*a*1 of the inner stop 46*a*, the bottom surface 32*a*1 in the circumferential groove 32*a*, and the end surface 34*a* of the protruding end 34 are formed flat so as to be parallel to each other.

<Elevation Mechanism>

Next, a description is given of the elevation mechanism 43 (see FIG. 2). The elevation mechanism 43 (drive mechanism) includes, as shown in FIG. 2, a driving source 43*a* having an electric motor, a hydraulic pressure generator, and the like, a pair of upper and lower vertically-moved pressing boards 43*b* moved up and down by the driving source 43*a*, and a rubber damper 43*c* provided between the pair of vertically-moved pressing boards 43*b*.

Figure 4:
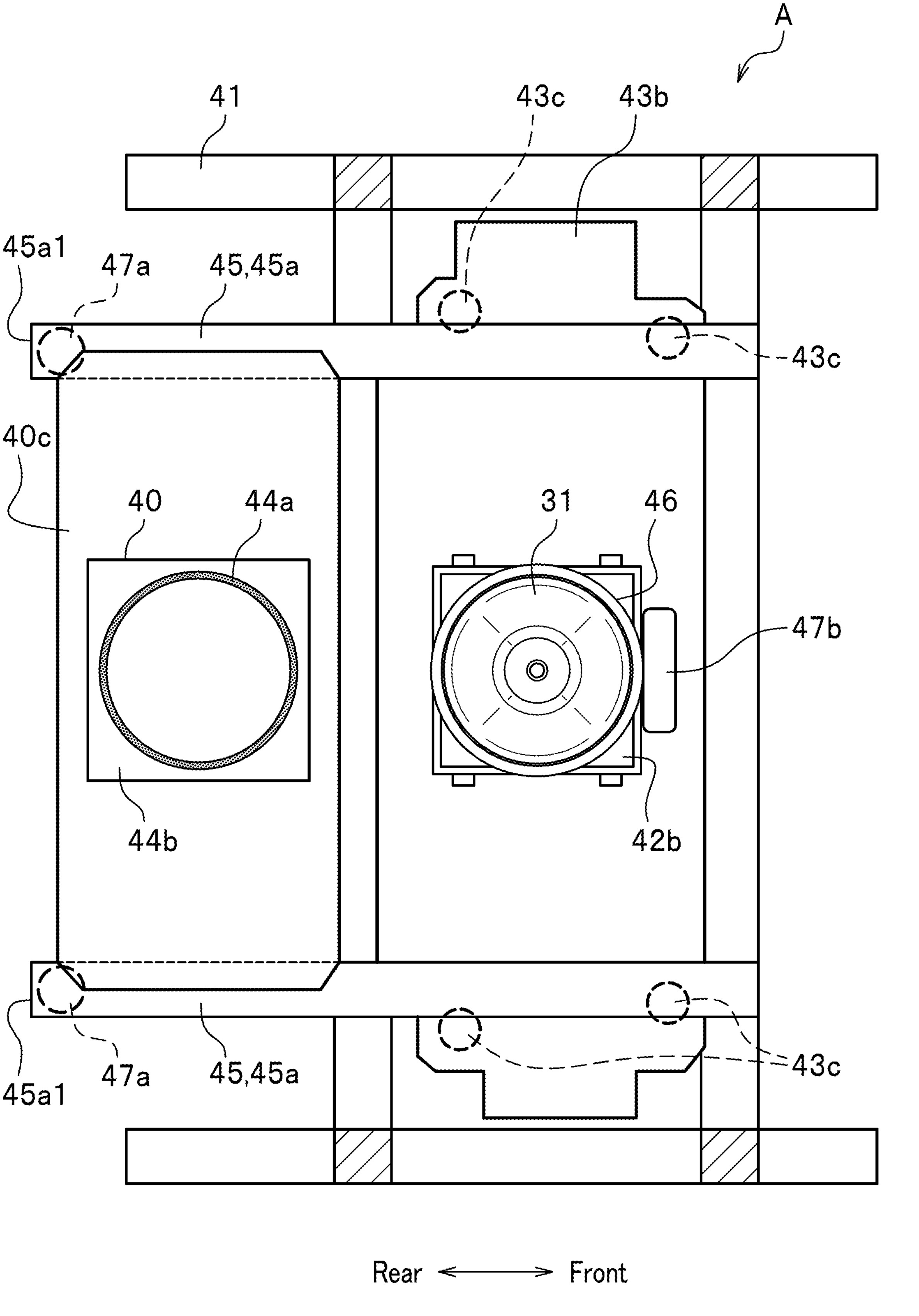
FIG. 4 illustrates a configuration of the high-pressure tank liner manufacturing device, as viewed from above in a cross-section taken along a line IV-IV in FIG. 2.

FIG. 4 illustrates a configuration of the manufacturing device A, as viewed from above in a cross-section taken along a line IV-IV in FIG. 2. In FIG. 4, the reference sign 43*b* indicates the vertically-moved pressing board, on the upper side, of the pair of the vertically-moved pressing boards 43*b* in FIG. 2. As shown in FIG. 4, the vertically-moved pressing board 43*b* on the upper side is made of a board with flat surfaces in a substantially rectangular shape, having a right-to-left length longer than a front-to-rear length. The rubber dampers 43*c* are anchored to, at substantially four corners of, each of the vertically-moved pressing boards 43*b*. The rubber dampers 43*c* work as a suspension system when the elevation mechanism 43 causes end surfaces of the liner halves 31 to contact with each other, as will be described below.

As shown in FIGS. 2 and 4, the upper vertically-moved pressing board 43*b* is to be provided, on an upper surface thereof, with the lower liner half 31 via the support jig 46 and lower supporter 42*b*, and has the heater 40 provided via the transportation mechanism 45. That is, as shown in FIG. 2, the elevation mechanism 43 drives the lower liner half 31 so as to be moved closer to, or away from, the upper liner half 31 fixed to an upper portion of the frame 41, along with the heater 40 and transportation mechanism 45 which are integrated with the lower liner half 31.

<Heater>

Next, a description is given of the heater 40 (see FIG. 2) of the manufacturing device A (see FIG. 2). As shown in FIG. 2, the manufacturing device A includes an upper heater 40*a* to heat the liner half 31 on the upper side, and a lower heater 40*b* to heat the liner half 31 on the lower side. The upper heater 40*a* and lower heater 40*b* are integrated back to back via a support plate 40*c*. In particular, the upper heater 40*a* and lower heater 40*b* are integrally joined to each other so as to have a heat source 44*a*, to be described below, exposed on each of opposite sides of the support plate 40*c*. Note that the upper heater 40*a* and lower heater 40*b* are collectively referred to as the "heater 40" when there is no need of distinguishing one from the other. Incidentally, a reference sign P1 in FIG. 2 refers to a waiting position for the heater 40 to wait at a position away from the pair of the liner halves 31, prior to heating the liner halves 31. Additionally, a reference sign P2 is a heating position, to be described below, for the heater 40 to heat the liner halves 31.

Figure 5:
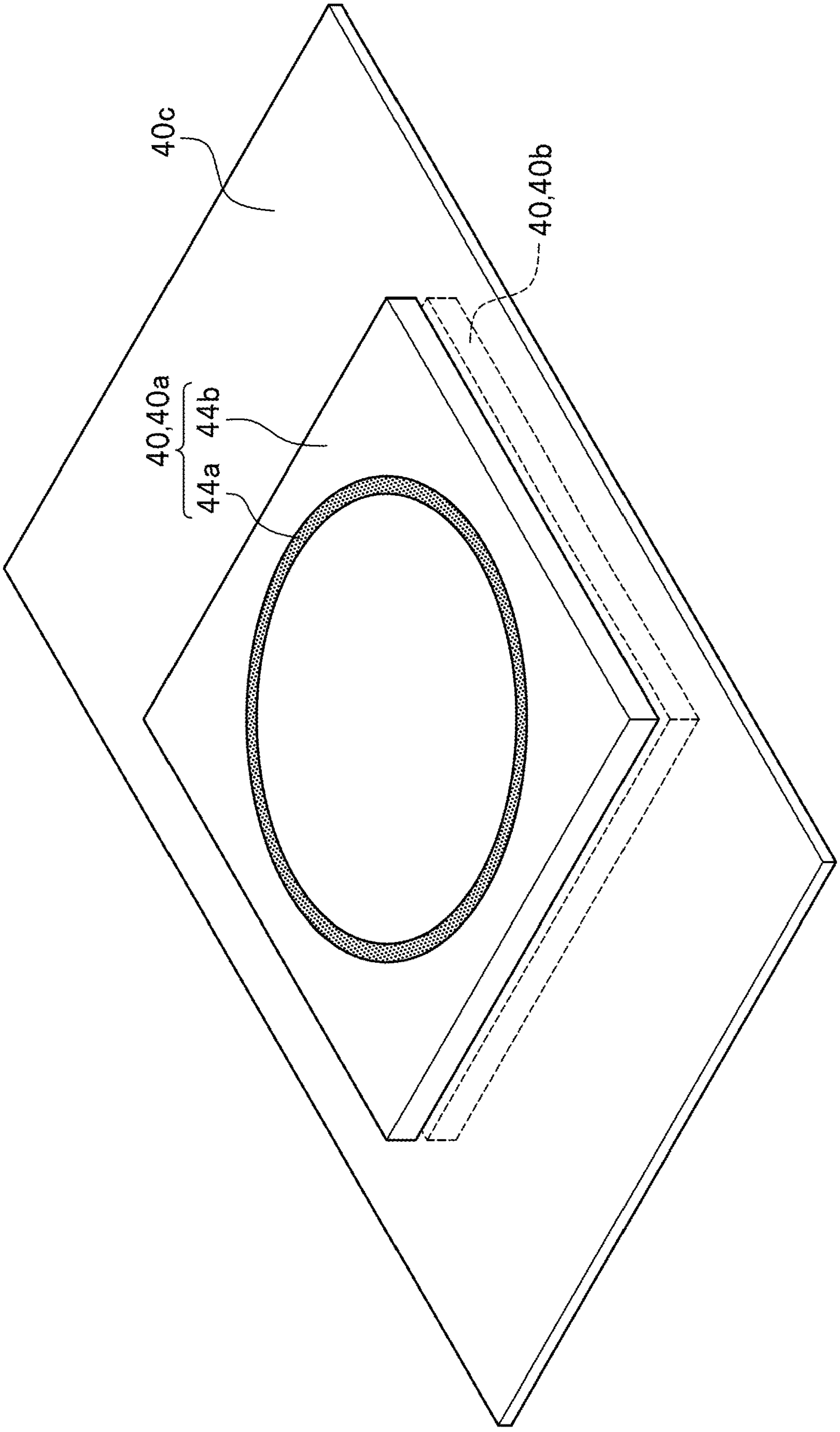
FIG. 5 is an overall perspective view of a heater of the manufacturing device in FIG. 2.

FIG. 5 is an overall perspective view of the heater 40. The heater 40 includes the heat source 44*a* and a base member 44*b* supporting the heat source 44*a*, as shown in FIG. 5. The heater 40 of the embodiment heats the end surfaces 34*a* of the protruding ends 34 to melt welding margins 35 (see FIG. 7C) of the protruding ends 34, in a heating step of heating the liner halves 31 (see FIG. 7C) of a "high-pressure tank liner manufacturing method" to be described below.

The heater 40 of the embodiment includes the base member 44*b* comprising a plate having a substantially square planar shape, and the heat source 44*a* buried in the base member 44*b* so as to be in a ring shape. The upper heater 40*a* and lower heater 40*b* are provided in the center of the support plate 40*c*. Incidentally, the heat source 44*a* of the embodiment is assumed to be one utilizing Joule heat by a heating wire or the like, radiant heat by far infrared rays, or the like but is not limited thereto.

Figure 7A:
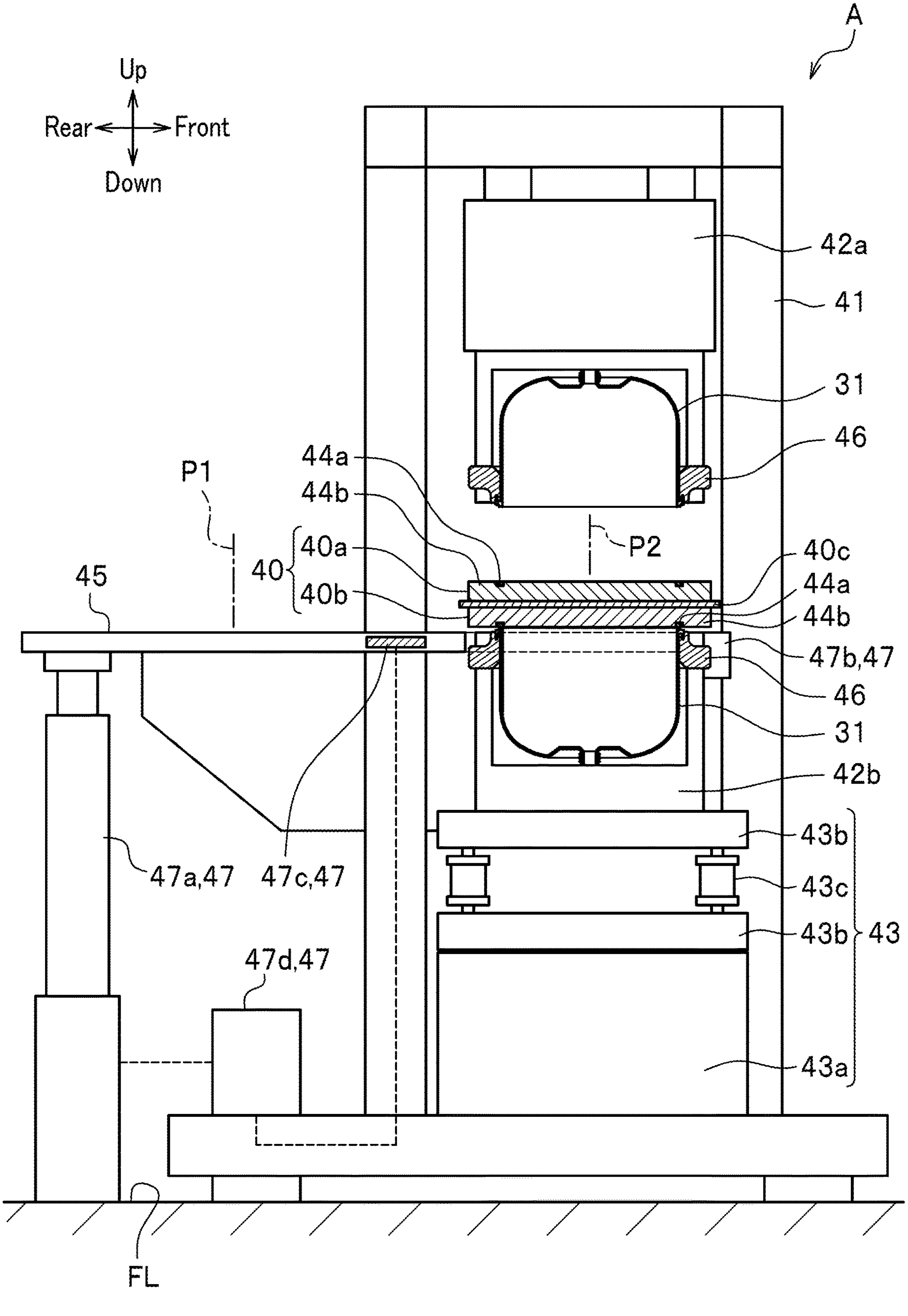
FIG. 7A is a diagram illustrating a transporting heater step of the high-pressure tank liner manufacturing method according to the embodiment of the present invention.
Figure 7B:
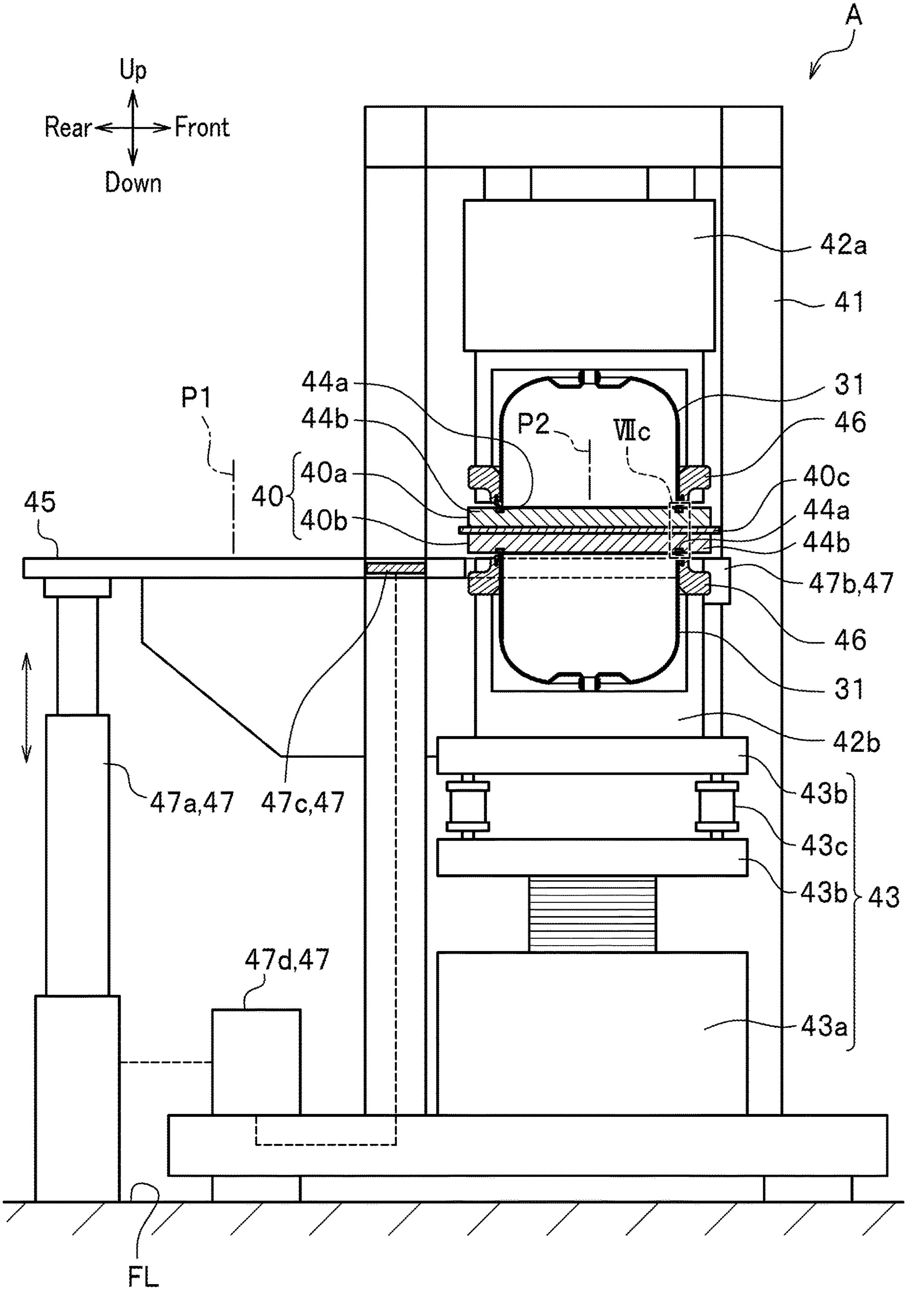
FIG. 7B is a diagram illustrating a first parallelism adjusting step of the high-pressure tank liner manufacturing method according to the embodiment of the present invention.
Figure 7C:
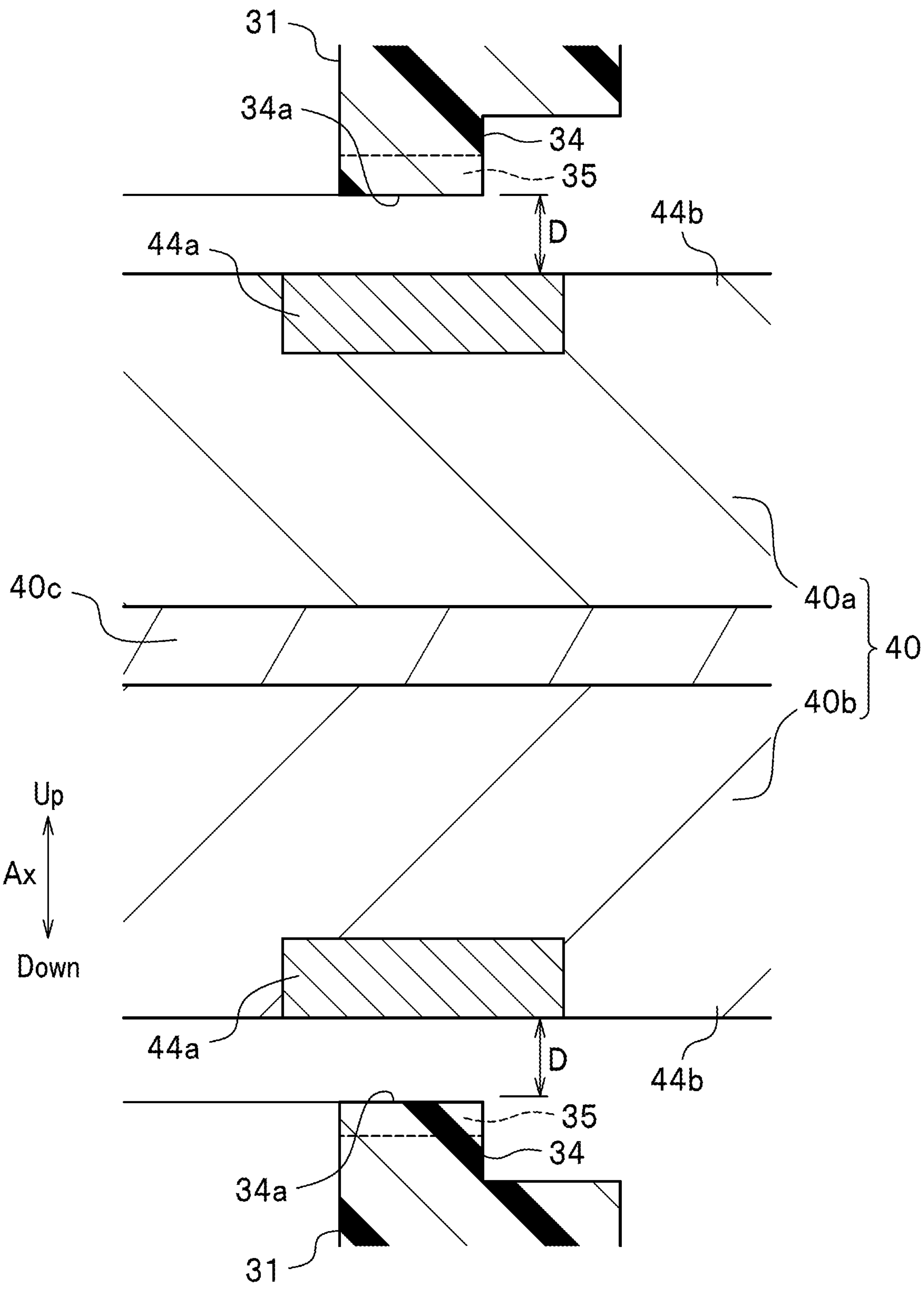
FIG. 7C is a partially enlarged view of a portion VIIc in FIG. 7B.

The heat source 44*a* of the upper heater 40*a* is arranged so as to face the end surface 34*a* of the protruding end 34 in FIG. 3A in the heating step of heating the liner halves 31 (see FIG. 7C). Likewise, the heat source 44*a* (not shown in FIG. 5) of the lower heater 40*b* in FIG. 2 is arranged so as to face the end surface 34*a* of the protruding end 34 in FIG. 3B in the heating step of heating the liner halves 31 (see FIG. 7C). That is, an inner diameter and an outer diameter of the heat source 44*a* of each of the upper heater 40*a* and lower heater 40*b* in FIG. 2 are set in association with those of each of the end surfaces 34*a* of the protruding ends 34 in FIGS. 3A and 3B.

The heater 40 as described above has the support plate 40*c* spanning a pair of rail members 45*a* of the transportation mechanism 45 via rolling members such as rollers (not shown), as shown in FIG. 4, so as to be supported by the vertically-moved pressing board 43*b*, on the upper side, of the elevation mechanism 43 (see FIG. 2).

<Heater Transportation Mechanism>

Next, a description is given of the transportation mechanism 45 (see FIG. 4). As shown in FIG. 4, the transportation mechanism 45 includes the pair of rail members 45*a* extending along a front-rear direction on laterally both sides of the lower liner half 31, as the manufacturing device A viewed from above. The rail members 45*a* guide the heater 40 so as to be slidably moved between the waiting position P1 (see FIG. 2) for the heater 40, as described above, and the heating position P2 (see FIGS. 7A and 7B), as described below. The rail members 45*a* are fixed to the vertically-moved pressing board 43*b*, on the upper side, and extend more rearward than a rear end of the frame 41.

The transportation mechanism 45 includes the rolling members arranged between the support plate 40*c* and the rail members 45*a*, a driving source such as an electric motor coupled to the support plate 40*c* via a chain or the like to slidably move the heater 40, a controller (not shown) to command the driving source so as to slidably move the heater 40 at a predetermined timing and to stop the heater 40 at the waiting position P1 (see FIG. 2) and the heating position P2 (see FIGS. 7A and 7B) at predetermined timings, respectively, even though these components are not shown. Operation of the transportation mechanism 45 is described in detail below, along with a manufacturing method of the liner 2 (see FIG. 1) of the embodiment.

<Parallelism Adjustment Mechanism>

Next, a description is given of the parallelism adjustment mechanism 47 (see FIG. 2) of the manufacturing device A (see FIG. 2). As shown in FIG. 2, the parallelism adjustment mechanism 47 includes a load applier 47*a* to apply a load upward to the rail members 45*a*, a counter weight 47*b* attached to the lower supporter 42*b*, a sensor 47*c* to detect parallelism of the end surface of the lower liner half 31 to the end surface of the upper liner half 31, and a controller 47*d* to send a command signal to the load applier 47*a* based on a detection signal from the sensor 47*c* so that a load is applied to the rail members 45*a* to keep parallelism of the end surfaces of the liner halves 31 within a predetermined range.

The load applier 47*a* of the embodiment is assumed to be one having an air cylinder fixed to a floor FL via an anchor (not shown). However, the load applier 47*a* is not limited to an air cylinder as far as being capable of applying a predetermined load, and may be one to generate a load by way of hydraulic pressure or electric power. Note that the load applier 47*a* of the embodiment is assumed to be provided so as to vertically extend between rear ends 45*a*1 of the pair of rail members 45*a* and the floor FL, as shown in FIG. 2. That is, the load applier 47*a* of the embodiment is assumed to be provided adjacent to the waiting position P1 for the heater 40. However, the load applier 47*a* may be provided at any position in the front-rear direction between the rear end 45*a*1 of the rail member 45*a* and a rear edge of the vertically-moved pressing boards 43*b*, as viewed from above in FIG. 4. Additionally, the number of the load appliers 47*a* provided for each of the rail members 45*a* is not limited to one and may be two or more.

The counter weight 47*b* of the embodiment is attached to an upper front portion of the lower supporter 42*b*, as shown in FIG. 2. The counter weight 47*b* is attached to the lower supporter 42*b* on an opposite side of the heating position P2 for the heater 40 to the waiting position P1 for the heater 40. The counterweight 47*b* as described above generates a moment of the upper front portion of the lower supporter 42*b* moving downward, to allow for reducing a load applied by the load applier 47*a* to the rail member 45*a*.

The sensor 47*c* detects parallelism of the end surface of the lower line half 31 (end surface 34*a* of the protruding end 34 in FIG. 3B) to the end surface of the upper line half 31

(end surface 34*a* of the protruding end 34 in FIG. 3A). Note that the sensor 47*c* in FIG. 2 is schematically illustrated and does not particularly show a shape or an attachment position.

The sensor 47*c* of the embodiment is not particularly limited as far as being capable of detecting parallelism of the end surfaces of the liner halves 31 and outputting a detection signal. The sensor 47*c* as described above may be either a contact type sensor or an optical sensor, including one to detect a relative distance between the end surfaces of the liner halves 31 such as by a contact scanning probe or a non-contact laser sensor, for example. A commercially available product (such as a vectoron by Keyence) may be used as the sensor 47*c*.

Alternatively, the sensor 47*c* may be a parallelism detection sensor to detect parallelism of the end surface of the lower liner half 31 (end surface 34*a* of the protruding end 34 in FIG. 3B), assuming that the end surface of the upper line half 31 (end surface 34*a* of the protruding end 34 in FIG. 3A) is fixed so as to be horizontal.

The controller 47*d* sends a command signal to the load applier 47*a* based on a detection signal from the sensor 47*c*. In particular, the controller 47*d* controls a load, applied by the load applier 47*a* to the rail members 45*a*, to keep parallelism of the end surfaces of the liner halves 31 within a predetermined range (such as 0.2 mm or less). More in particular, the controller 47*d* controls a load outputted from the load applier 47*a*, when determining that a deviation from parallelism has exceeded 0.2 mm based on the detection signal from the sensor 47*c*, so that a deviation from parallelism based on the detection signal from the sensor 47*c* converges to the minimum baseline (such as 0.1 mm) set in advance. Note that the controller 47*d* is not an essential component and an operator, who has obtained a specific value of parallelism outputted from the sensor 47*c*, may operate the load applier 47*a* to adjust parallelism so as to be kept within a predetermined range.

<<High-Pressure Tank Liner Manufacturing Method>>

Figure 6:
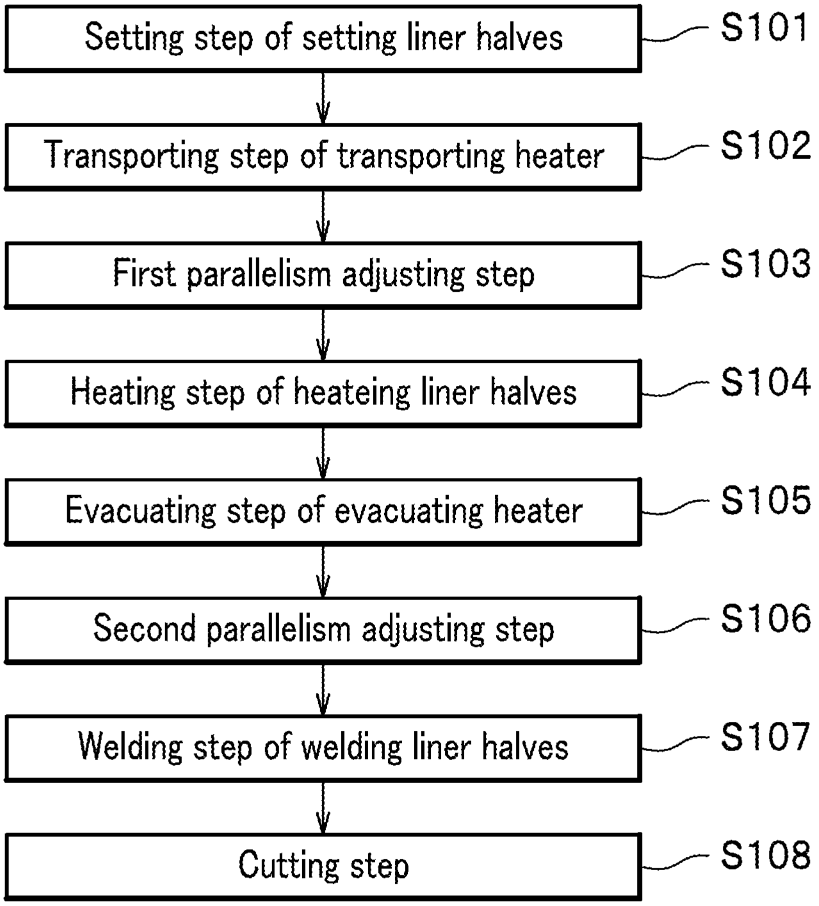
FIG. 6 illustrates steps of a high-pressure tank liner manufacturing method according to an embodiment of the present invention.

Next, a description is given of a manufacturing method of the embodiment, with operation of the manufacturing device A (see FIG. 2) of the embodiment. FIG. 6 illustrates steps of a manufacturing method of the liner 2 (see FIG. 1) according to the embodiment of the present invention. As shown in FIG. 6, the manufacturing method includes a setting step (step S101) of setting a pair of the liner halves 31 (see FIG. 2), a transporting step (step S102) of transporting the heater 40 (see FIG. 2), a first parallelism adjusting step (step S103), a heating step (step S104) of heating the liner halves 31, a moving away step (step S105) of evacuating the heater 40, a second parallelism adjusting step (step S106), a welding step (step S107) of welding the liner halves 31 with each other, and a cutting step (step S108) of cutting a joined portion of the liner halves 31 welded with each other into a single piece in the welding step.

<Setting Step of Setting Liner Halves>

In the setting step of setting the liner halves 31 (see FIG. 2), as S101 in FIG. 6, a pair of the liner halves 31 are set up as described above. The liner halves 31 of the embodiment is assumed to be those obtained by an injection molding method or a blow molding method. In the setting step, the liner halves 31 are attached to the upper and lower support jigs 46, respectively, so that the end surfaces of the pair of the liner halves 31 (the end surface 34*a* of the protruding end 34 in FIG. 3A, and the end surface 34*a* of the protruding end 34 in FIG. 3B) vertically face each other, as shown in FIG. 2.

<Transporting Heater Step>

FIG. 7A is a diagram illustrating a transporting heater step of step S102 in FIG. 6. As shown in FIG. 7A, the heater 40 is transported in the transporting heater step by the transportation mechanism 45 from the waiting position P1 to the heating position P2. This causes the heater 40 to be set above the lower liner half 31. At this time, the heating source 44*a* of the lower heater 40*b* and the end surface of the lower liner half 31 (see the end surface 34*a* in FIG. 7C) face each other at a distance D (see FIG. 7C) to be described below, even though not shown.

<First Parallelism Adjusting Step>

In the first parallelism adjusting step of step S103 in FIG. 6, the lower liner half 31 in FIG. 7A is lifted upward by the elevation mechanism 43, integrally with the heater 40, keeping the distance D (see FIG. 7C) from the heating source 44*a* of the lower heater 40*b*. FIG. 7B is a diagram illustrating the first parallelism adjusting step of step S103 in FIG. 6. As shown in FIG. 7B, the upper heater 40*a* is in vicinity to the upper liner half 31.

As shown in FIG. 7C as a partially enlarged view of a portion VIIc in FIG. 7B, the end surface of the upper liner half 31 (end surface 34*a* of the protruding end 34) faces the heating source 44*a* of the upper heater 40*a* at the distance D. The sensor 47*c* in FIG. 7B detects parallelism of the end surfaces (end surfaces 34*a* of the protruding ends 34) of the upper and lower liner halves 31 shown in FIG. 7C and outputs a detection signal of the parallelism. The controller 47*d* in FIG. 7B controls a load to be applied by the load applier 47*a* in FIG. 7B to the rail members 45*a* in FIG. 7B, to keep parallelism of the end surfaces of the liner halves 31 within a predetermined range (such as 0.2 mm or less), based on the detection signal from the sensor 47*c*.

<Heating Step of Heating Liner Halves>

In the heating step of step S104 in FIG. 6, the end surfaces of the liner halves 31 (end surfaces 34*a* of the protruding ends 34) in FIG. 7C, having parallelism set within the predetermined range, are heated by the heater 40 in FIG. 7C. This causes the welding margins 35 of the protruding ends 34 in FIG. 7C to be heated and melted.

<Evacuating Heater Step>

Figure 7D:
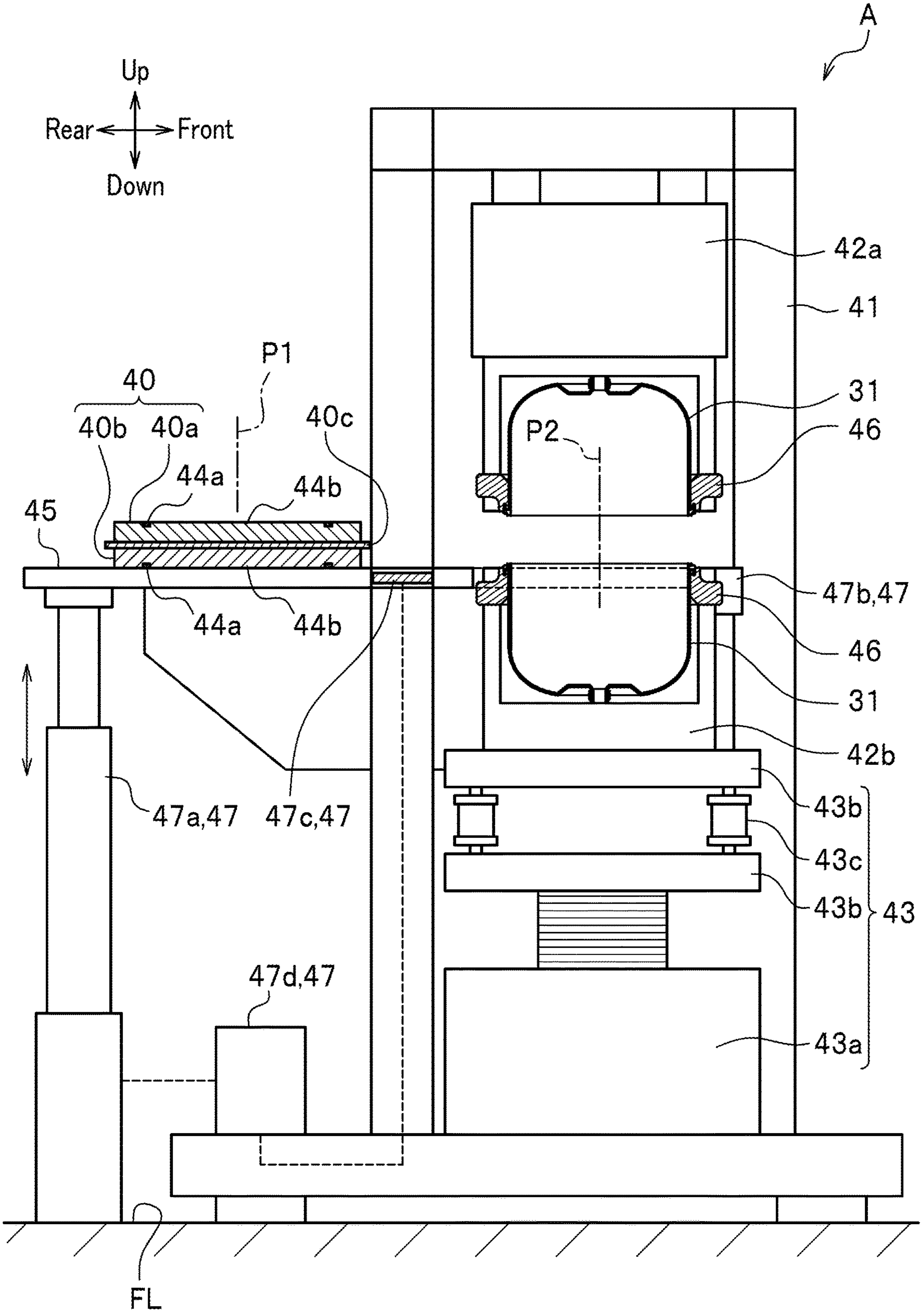
FIG. 7D is a diagram illustrating an evacuating heater step of the high-pressure tank liner manufacturing method according to the embodiment of the present invention.

FIG. 7D is a diagram illustrating the evacuating heater step of step S105 in FIG. 6. As shown in FIG. 7D, in the evacuating heater step, the heater 40 at the heating position P2 (see FIG. 7C) in FIG. 7C, is slidably moved by the transportation mechanism 45 to the waiting position P1 for evacuation. This causes the heater 40 to be moved to a position away from the pair of the liner halves 31.

<Second Parallelism Adjusting Step>

In the second parallelism adjusting step of step S106 in FIG. 6, the sensor 47*c* detects parallelism of the end surfaces of the upper and lower liner halves 31, with the heater 40 positioned at the waiting position P1, as shown in FIG. 7D, and outputs a detection signal of the parallelism. The controller 47*d* controls a load to be applied by the load applier 47*a* to the rail members 45*a*, to keep parallelism of the end surfaces of the liner halves 31 within a predetermined range (such as 0.2 mm or less), based on the detection signal from the sensor 47*c*.

<Welding Step of Welding Liner Halves>

Figure 7E:
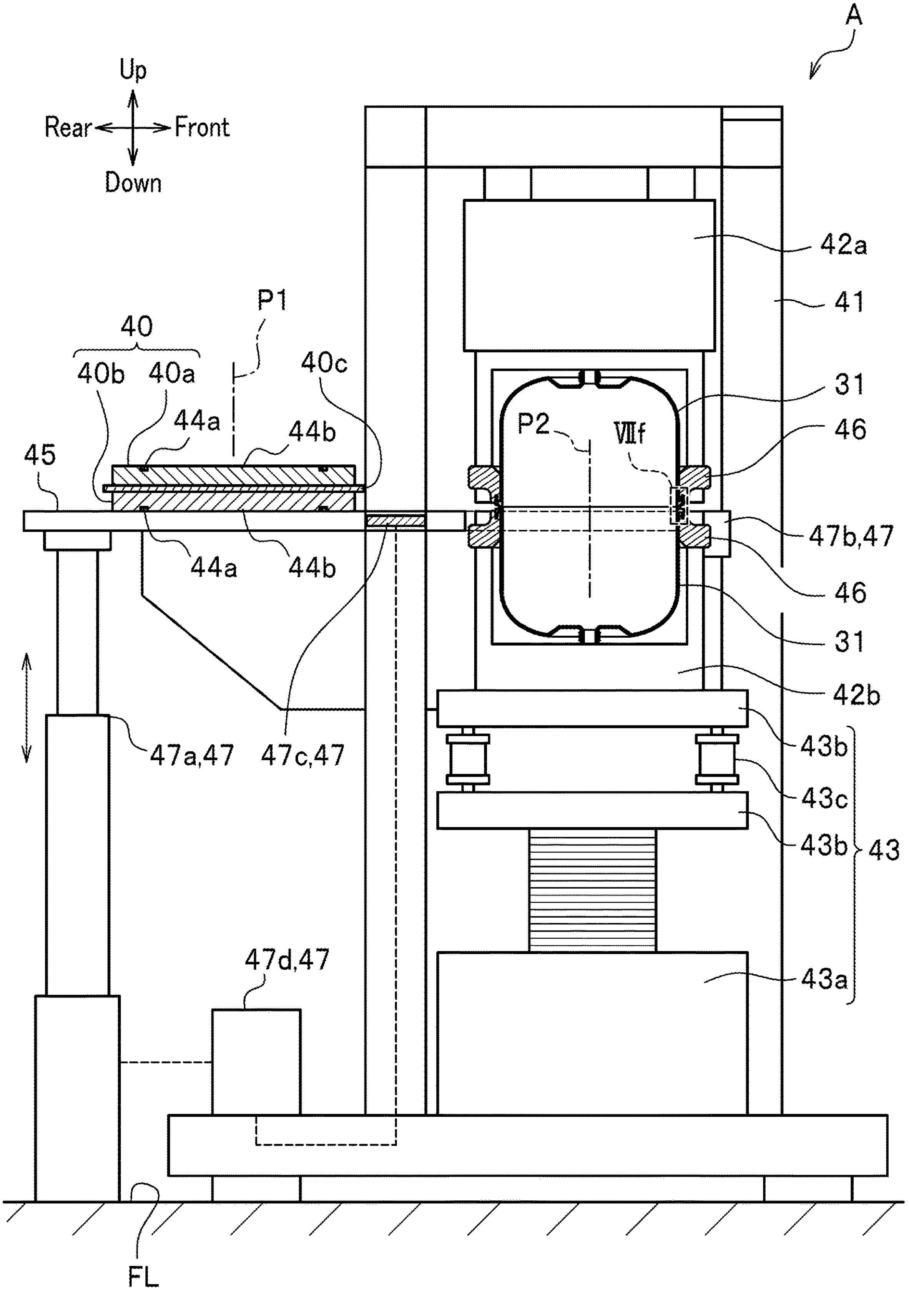
FIG. 7E is a diagram illustrating a welding step, welding liner halves, of the high-pressure tank liner manufacturing method according to the embodiment of the present invention.
Figure 7F:
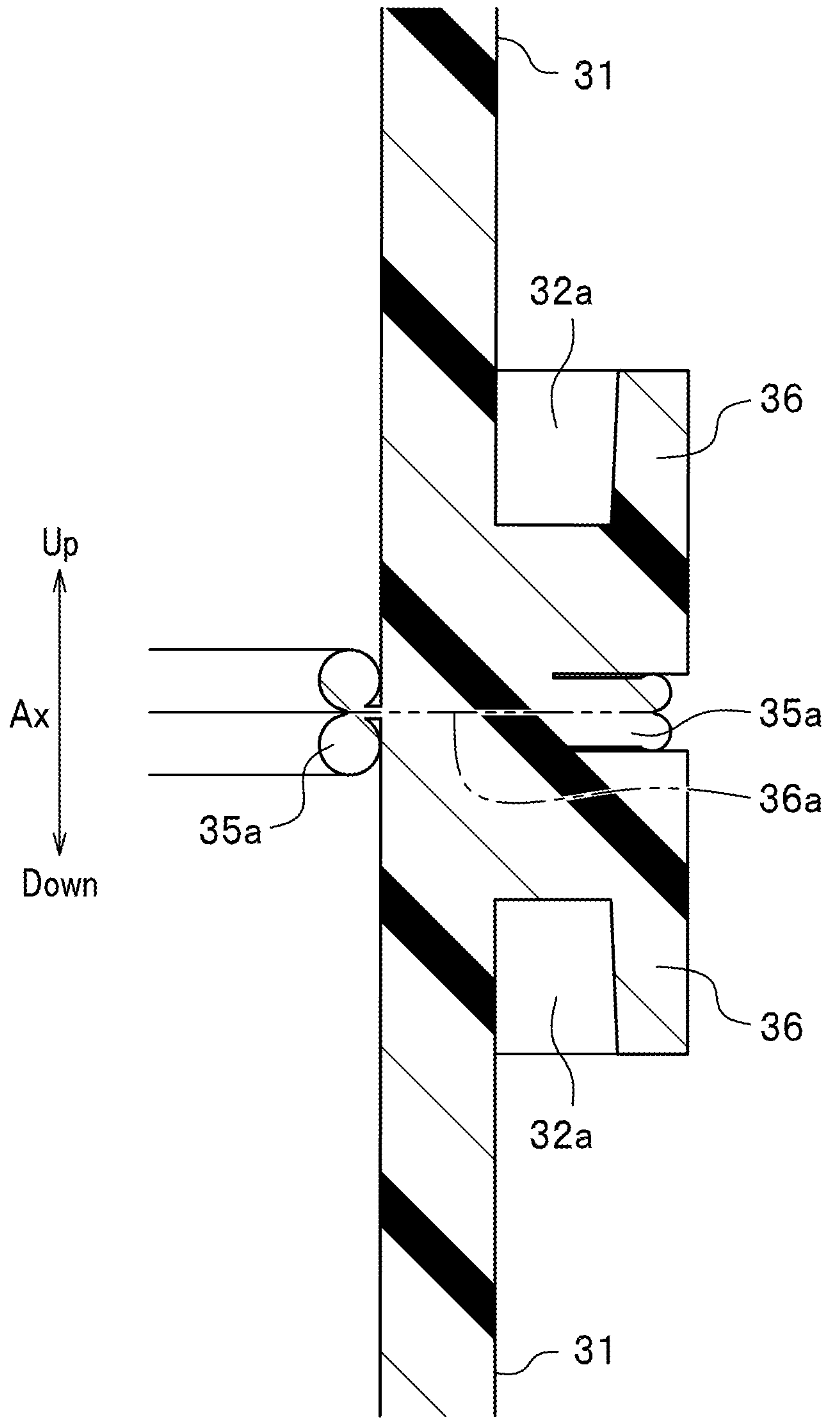
FIG. 7F is a partially enlarged view of a portion VIIf in FIG. 7E.

A description is given of the welding step of step S107 in FIG. 6. FIG. 7E is a diagram illustrating the welding step. FIG. 7F is a partially enlarged view of a portion VIIf in FIG. 7E. In the welding step, the lower liner half 31 is further lifted upward by the elevation mechanism 43 from a height shown in FIG. 7D, as shown in FIG. 7E. As shown in FIG. 7F, the end of the upper liner half 31 is welded with the end of the lower liner half 31.

Particularly in the welding step, the liner halves 31 are pushed against each other by a predetermined load, using the support jigs (not shown), to cause a meltage 35*a* of the melting margins 35 (see FIG. 7C) to flow in a direction intersecting a direction of the liner halves 31 being pushed against each other (axis Ax direction), as shown in FIG. 7F. This allows the meltage 35*a* of the liner halves 31 to mix with each other on a welding surface 36*a* shown with an imaginary line (dash-dot-dot-dash line). With the meltage 35*a* cooled down, the liner halves 31 are integrated and connected with each other at the welding surface 36*a*. Note that in the welding step as described above, the liner halves 31 may be vibrated by a vibrator, when welded into a single piece at the welding surface 36*a*, to expedite the liner halves 31 being welded with each other.

<Cutting Step>

Figure 7G:
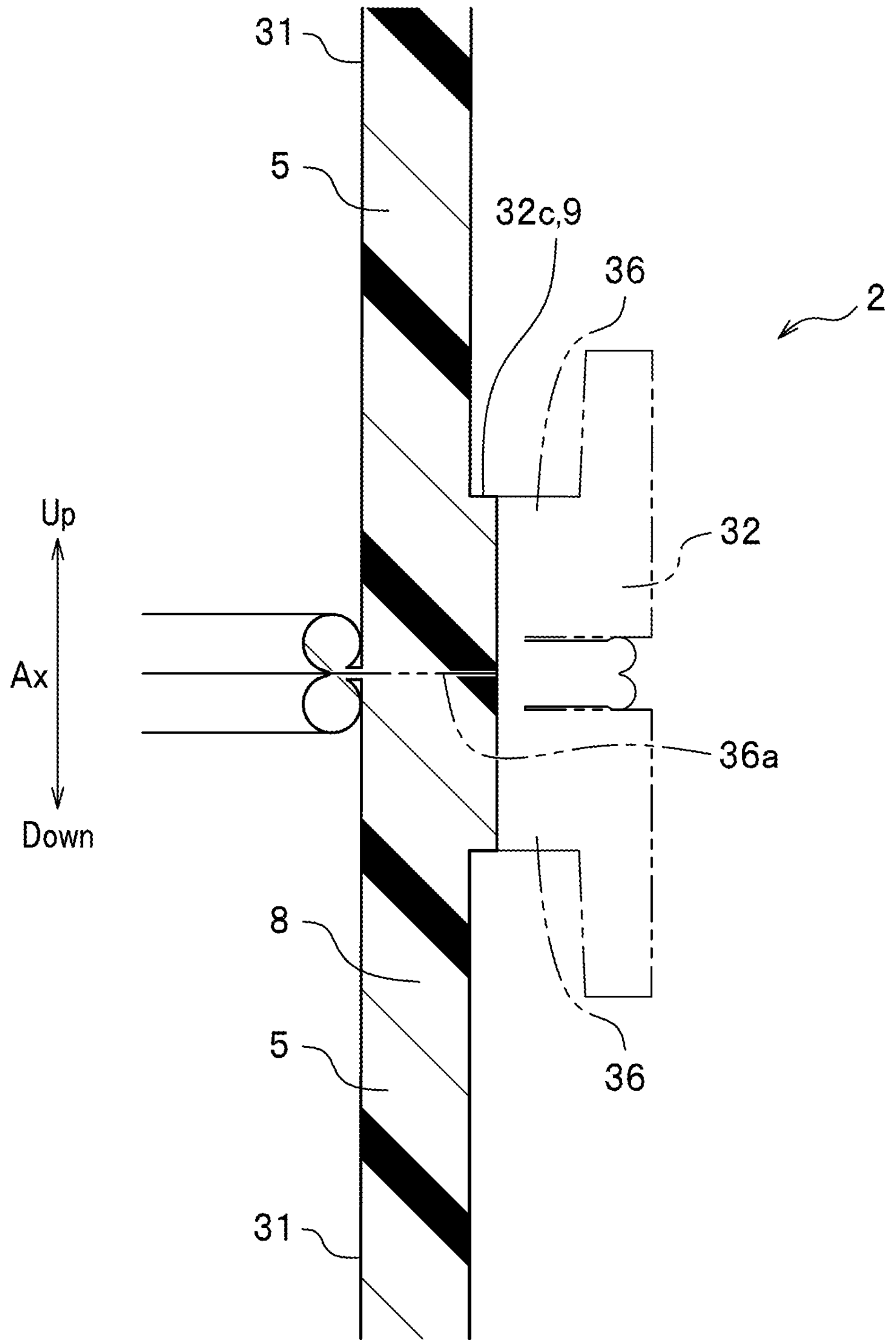
FIG. 7G is a diagram illustrating a cutting step of the high-pressure tank liner manufacturing method according to the embodiment of the present invention.

A description is given of the cutting step of step S108 in FIG. 6. FIG. 7G is a diagram illustrating the cutting step. As shown in FIG. 7G, the flanges 32 (shown in imaginary lines (dash-dot-dot-dash lines)) of the joined portions 36 are removed by cutting, leaving root portions 32*c*. The left root portions 32*c* form the expanded diameter portion 9 of the liner 2. This completes a set of manufacturing steps of the liner 2 (see FIG. 1) of the embodiment.

Advantageous Effects

Next, a description is given of advantageous effects of the manufacturing method of the liner 2 and manufacturing device A of the liner 2, to implement the manufacturing method, of the embodiment. In order to prevent parallelism of the end surfaces of the liner halves 31 from being deviated from a predetermined range set in advance because of the heater 40, as a heavy object, being slidably moved between the waiting position P1 and heating position P2, the manufacturing device A and manufacturing method of the embodiment adjust the parallelism in accordance with the heater 40 being slidably moved. This allows the manufacturing device A and manufacturing method of the embodiment accomplish expected favorable quality of welding the liner halves 31 with each other.

In addition, the manufacturing device A of the embodiment includes the load applier 47*a* configured to apply a load upward to the rail member 45*a* configured to guide the heater 40 in a direction of the heater 40 being slidably moved. The manufacturing device A reduces by the load applier 47*a* a load of the heater 40 applied to the manufacturing device A, which causes parallelism of the end surfaces of the liner halves 31 to be deviated from a predetermined range set in advance. According to the manufacturing device A as described above, parallelism of the end surfaces of the liner halves 31 is adjusted by a simple structure.

Further, the manufacturing device A of the embodiment includes the counterweight 47*b* on an opposite side of the heating position P2 for the heater 40 to the waiting position P1 for the heater 40. The manufacturing device A generates by the counterweight 47*b* a downward moment on the opposite side of the heating position P2 to the waiting position P1 for the heater 40, against a moment applied upward by the load applier 47*a* to the rail members 45*a*. According to the manufacturing device A as described above, a load to be applied by the load applier 47*a* to the rail members 45*a* is reduced by the counter weight 47*b*.

Still further, the manufacturing device A of the embodiment has the elevation mechanism 43 (drive mechanism) configured to move the lower liner half 31, integrally with the heater 40, closer to, or away from, the fixed upper liner half 31. According to the manufacturing device A as described above, a structure of the lower liner half 31 being coupled with the heater 40 allows a load applied by the load applier 47*a* to the rail members 45*a* to be directly and efficiently reflected in adjusting the parallelism.

Still further, the manufacturing device A of the embodiment has the parallelism adjustment mechanism 47 sets parallelism of the end surfaces of the liner halves 31 within a predetermined range, based on a detection signal from the sensor 47*c*. According to the manufacturing device A as described above, the parallelism of the end surfaces of the liner halves 31 is adjusted precisely and promptly.

Still further, in addition to the parallelism adjusting step (see step S106 in FIG. 6) executed prior to the welding step, the manufacturing method of the embodiment executes another parallelism adjusting step (see step S103 in FIG. 6) executed between the transporting heater step (see step S102 in FIG. 6) and the heating step (see step S104 in FIG. 6). According to the manufacturing method as described above, the end surfaces of the liner halves 31 are evenly heated by the heater 40, to further improve quality of welding the liner halves with each other.

Hereinabove, the embodiment has been described, but the present invention is not limited thereto and can be implemented in various forms. The manufacturing device A of the embodiment has the load applier 47*a* configured to apply a load upward to the rail member 45*a*, but the load applier 47*a* may be configured to apply a load so as to hoist the rail members 45*a* upward.

In addition, the embodiment is configured to have the lower line half 31 moved closer to, or away from, the fixed upper line half 31, but may be configured to have the upper line half 31 moved closer to, or away from, the lower line half 31. Alternatively, the manufacturing device A may be configured to have the lower line half 31 and upper line half 31 moved closer to, or away from, each other.

Further, the embodiment has the parallelism detected by the sensor 47 according to the heater 40 being moved. However, the parallelism may be obtained through a simulation test or the like executed in advance when the heater 40 was positioned at the waiting position P1 and when the heater 40 was positioned at the heating position P2, and the load applier 47*a* may apply a load to the rail members 45*a* so that the parallelism is within a predetermined range.

LIST OF REFERENCE SIGNS

1: high-pressure tank, 2: high-pressure tank liner, 4: fiber reinforced resin layer, 5: body section, 8: general portion of body section, 9: expanded diameter portion of body section, 31: liner half, 32: flange of liner half, 33: opening of liner half, 34: protruding end of liner half, 34*a*: end surface of liner half (protruding end), 36: joined portion of liner halves, 40: heater, 40*a*: upper heater, 40*b*: lower heater, 43: elevation mechanism (drive mechanism), 45: transportation mechanism for heater (heater transportation mechanism), 45*a*: rail member, 46: support jig, 47: parallelism adjustment mechanism, 47*a*: load applier, 47*b*: counter weight, 47*c*: sensor, A: high-pressure tank liner manufacturing device, Ax: axis of high-pressure tank liner, P1: waiting position for heater, and P2: heating position for heater.

What is claimed is:

1. A high-pressure tank liner manufacturing device for welding end surfaces of a pair of liner halves arranged to face each other into a unitary piece, the device comprising:

a heater arranged between the end surfaces of the pair of liner halves, facing each other, to heat and melt the end surfaces of the pair of liner halves;

a heater transportation mechanism configured to slidably move the heater between a waiting position for the heater, away from the pair of liner halves, and a heating position for the heater set between, for heating, the end surfaces of the pair of liner halves;

a drive mechanism configured to drive at least one of the pair of liner halves so as to cause the pair of liner halves to be relatively moved closer to each other or away from each other; and a parallelism adjustment mechanism configured to adjust parallelism of the end surfaces of the pair of liner halves in accordance with the heater being slidably moved.

2. The high-pressure tank liner manufacturing device according to claim 1, wherein the end surfaces of the liner halves are set so as to vertically face each other, the heater transportation mechanism includes a rail member configured to guide the heater in a direction of the heater being slidably moved, and the parallelism adjustment mechanism includes a load applier configured to apply a load upward to the rail member.

3. The high-pressure tank liner manufacturing device according to claim 2, wherein the drive mechanism is configured to move a lower liner half of the pair of liner halves, integrally with the heater, closer to, or away from, a fixed upper liner half of the pair of liner halves.

4. The high-pressure tank liner manufacturing device according to claim 3, wherein the parallelism adjustment mechanism includes a sensor to detect parallelism of the end surface of the lower liner half to the end surface of the upper liner half, and the load applier applies a load to an end of the rail member, based on a detection signal from the sensor, to keep parallelism of the end surfaces of the liner halves within a predetermined range.

5. A high-pressure tank liner manufacturing method comprising:

a setting step of setting a pair of liner halves so as to face each other;

a transporting heater step of slidably moving a heater at a waiting position, away from the pair of liner halves, to a heating position set between, for heating, end surfaces of the pair of liner halves;

a heating step of heating and melting the end surfaces of the pair of liner halves;

an evacuating heater step of slidably moving the heater at the heating position to the waiting position for evacuation; and a welding step of welding the end surfaces of the pair of liner halves to make the pair of liner halves into a unitary piece, wherein the manufacturing method further comprises a parallelism adjusting step, at least between the evacuating heater step and the welding step, of adjusting parallelism of the end surfaces of the pair of liner halves in accordance with the heater being slidably moved.

6. The high-pressure tank liner manufacturing method according to claim 5, further comprising:

another parallelism adjusting step, between the transporting heater step and the heating step, of adjusting parallelism of the end surfaces of the pair of liner halves in accordance with the heater being slidably moved.

* * * * *